Oct. 9, 1962 R. E. CHRYSTLER 3,057,492
PORTABLE TRAILER
Filed Nov. 5, 1959 2 Sheets-Sheet 1
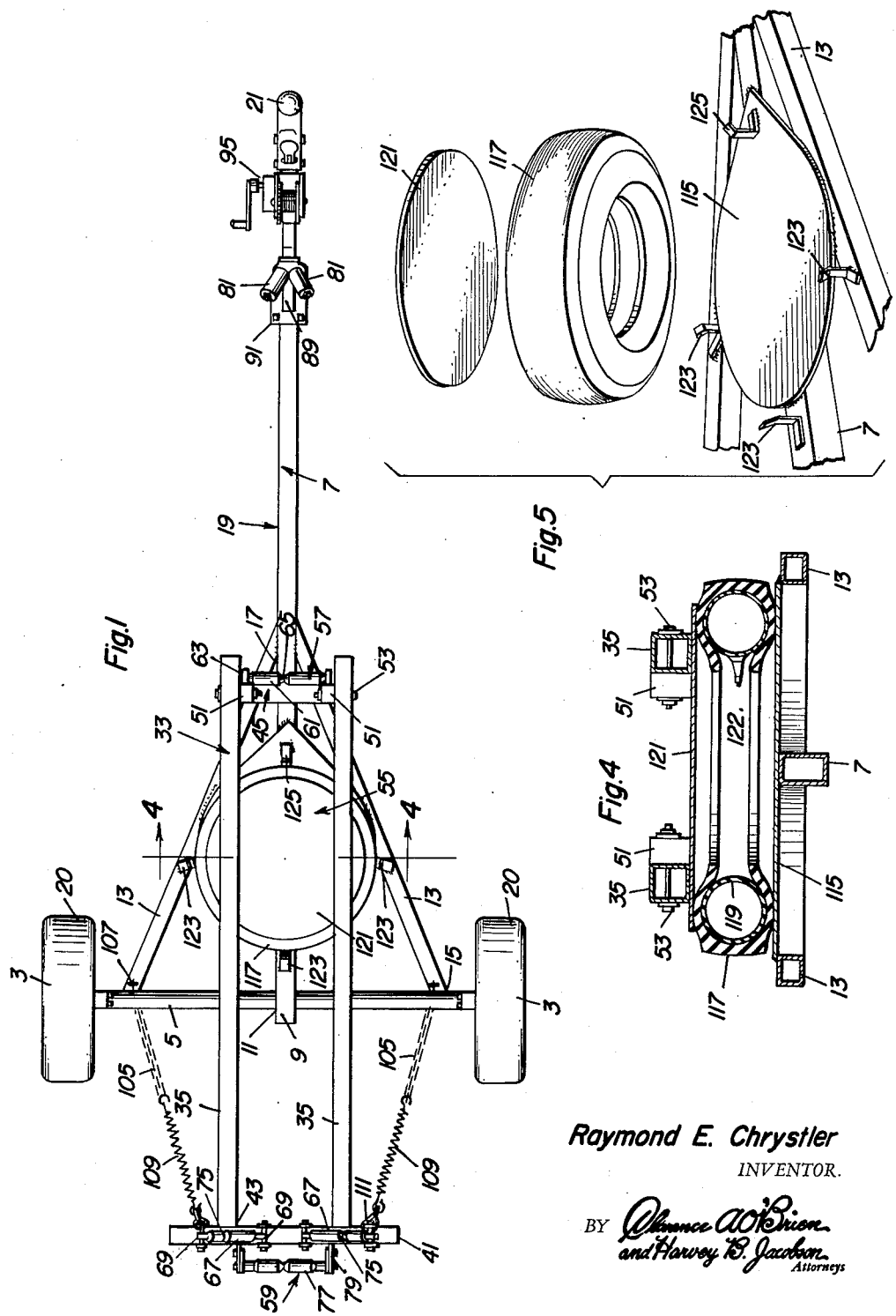
Raymond E. Chrystler
INVENTOR.

Oct. 9, 1962
R. E. CHRYSTLER
3,057,492
PORTABLE TRAILER
Filed Nov. 5, 1959
2 Sheets-Sheet 2
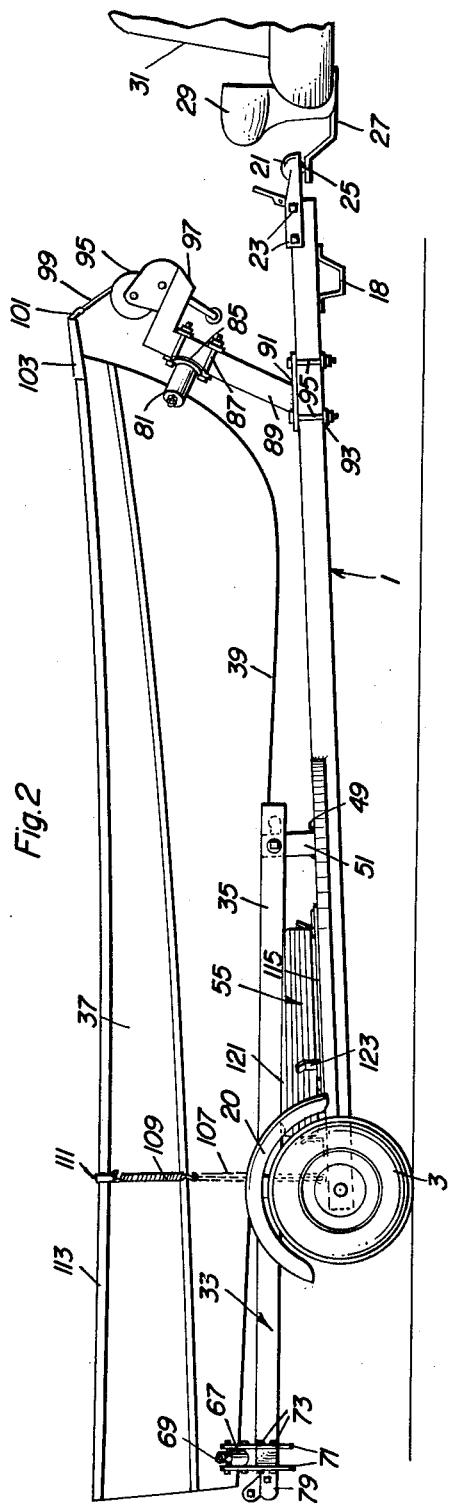
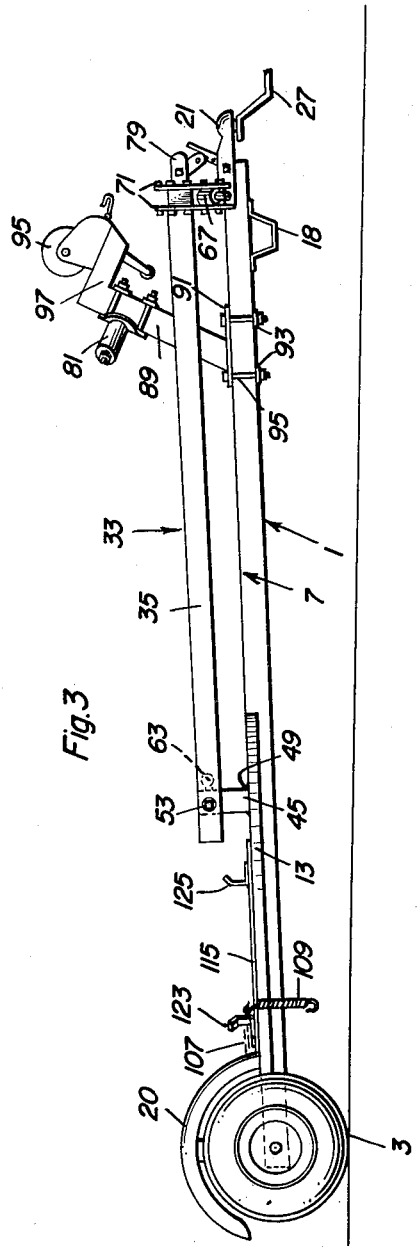
Raymond E. Chrystler
INVENTOR.
BY *Clarence A.O'Brien*
*and Harvey B. Jacobson*
Attorneys United States Patent Office
3,057,492
Patented Oct. 9, 1962

3,057,492
PORTABLE TRAILER
Raymond E. Chrystler, Howe, Ind.
(Rte. 4, Lagrange, Ind.)
Filed Nov. 5, 1959, Ser. No. 851,092
13 Claims. (Cl. 214—84)

This invention relates to improvements in boat trailers for towing by an automobile, or the like.

The primary object of the invention is to provide a boat trailer of simply constructed form for carrying small boats of different lengths safely over rough roads with a minimum of shock and jar.

To the accomplishment of the foregoing, and other objects presently appearing, the trailer of this invention involves, generally speaking, a boat supporting cradle pivotally mounted on a trailer chassis frame and supported by pneumatic cushion means thereunder variably inflatable for cushioning the cradle in accordance with the weight of the boat on the cradle, the cushioning means involving an annular inflatable air cushion interposed between a pair of compression plates, the annular air cushion being preferably in the form of a pneumatic tire and tube which are readily available and adequately serviceable for cushioning use, and the cradle being pivotal from over the air cushioning means for access thereto for replacing air cushion parts, and for swinging into an out-of-the-way position, together with resilient means for holding a boat down on the cradle, and means for pulling a boat onto the cradle, all as set forth in detail in the following description, and appended claims, and illustrated in the drawings accompanying and forming a part of this specification and in which:

FIGURE 1 is a view in plan of the boat trailer of this invention;

FIGURE 2 is a view in side elevation of the trailer hitched to an automobile for towing thereby and with the cradle supporting a boat thereon;

FIGURE 3 is a view in side elevation with the cradle swung into an out-of-the-way position and into a position for free access to the air cushioning means;

FIGURE 4 is an enlarged view in transverse section taken on the line 4—4 of FIGURE 1, and FIGURE 5 is an exploded view in perspective of parts of the pneumatic cushioning means and parts of the chassis frame.

Referring to the drawings by numerals, the trailer of this invention, and which is designated generally by the numeral 1, comprises a pair of rubber tired rear ground wheels 3, suitably journalled on the ends of the tubular, metal axle bar 5, an elongated tubular draft tongue 7 having a rear end 9 welded, as at 11, on the transverse center portion of the axle bar 5, and a pair of braces 13 at opposite sides of the tongue 7, also of tubular metal, converging forwardly from the axle bar 3 to the tongue 7 and terminally welded to said axle bar 5 and tongue 7, as at 15, 17 respectively. The axle bar 5, tongue 7 and braces 13 are preferably of square cross-section and may be formed of any light strong metal. A conventional ground engaging rest 18 is provided on the front end of the tongue 7. Suitable wheel guards 20 are provided on the axle bar 5.

The axle bar 5, tongue 7 and braces 13 form a chassis frame designated generally 19.

A conventional ball hitch 21 is suitably bolted, as at 23, on the front end of the tongue 7 for coupling to the usual hitch ball 25 on a hitched bracket 27 suitably fixed to the rear bumper 29 of a draft vehicle such as an automobile represented at 31.

A cradle, designated generally by reference numeral 33, comprises a pair of tubular, laterally spaced side-by-side parallel bars 35 of rectangular cross-section and light strong metal extending longitudinally over the chassis frame 19 with the major portions thereof forwardly of rearwardly of the ground wheels 3 and axle bar 5 upon opposite sides of the longitudinal center of the chassis frame 19 with the major portions thereof forwardly of the axle bar 5 in the boat supporting position of said cradle. The side bars 35 are spaced suitably for underlying the bottom of a boat 37 thereon at opposite sides of the keel 39 of the boat. A cross bar 41 of the same construction as the side bars 35 extends across the rear ends of said side bars 35 and is welded thereto, as at 43 and extends slightly outwardly of said side bars 35.

Means for pivotally mounting the cradle 33 on the chassis frame 19 comprises a tubular U-shaped yoke 45 of rectangular cross-section extending transversely of the tongue 7 and braces 13 adjacent the front ends of the latter and welded thereto as at 49 well forwardly of the axle 5 with a pair of upstanding arms 51 on which the side bars 35 adjacent their front ends are pivoted above the chassis frame 19 by horizontal bolts 53. Thus, as will be seen, the cradle 33 is swingable upwardly and forwardly from a substantially horizontal boat supporting position, shown in FIGURES 1 and 3 in which it extends rearwardly of the axle bar 5 and wheels 3, and into an inverted forward position, shown in FIGURE 3, clear of pneumatic cushioning means 55, presently described. In its forwardly swung inverted position, the cradle 3 clears the pneumatic cushioning means 55 for access to said means to replace parts of said cushioning means, when necessary. In its forwardly swung inverted position, the cradle 33 is in an out of the way position in which it does not project rearwardly from the chassis frame as it does when in boat supporting position.

The cradle 33 also includes front and rear boat supporting roller means 57, 59 respectively. The front roller means 57 comprises a transverse resilient roller 61 in front of the yoke 45 and between the side bars 35 journalled in bearing brackets 63 on the arms 51 to support an intermediate portion of the bottom of the boat 37, said roller 61 being centrally circumferentially grooved, as at 65, to accommodate the keel 39 of the boat.

The rear roller means comprises a pair of transverse resilient rollers 67 spaced apart end-to-end above the bar 41 and journalled in suitable bearings 69 interposed between pairs of upstanding bracket plates 71 welded, as at 73, to opposite sides of the bar 41. The rollers 67 support the stern end portion of the boat 37 at opposite sides of the keel 39 and are downwardly convergent relatively to support said bottom. The rollers 67 may be circumferentially grooved, as at 75 to accommodate in the grooves thereof bottom portions of a boat.

A rear transverse roller 77 for use in loading the boat 37 onto the rollers 61, 67 is journalled on the rear of the bar 41 below the rollers 67 between suitable bearing brackets 79 on said bar 41.

A pair of rearwardly diverging and rearwardly and upwardly inclined rollers 81 for straddling the prow 83 of the boat 37 are journalled in elevated position in a bearing bracket 85 bolted, as at 87, on a forwardly and upwardly inclined post 89 secured by a base plate 91 and cross bars 93 and bolts 95 on a forward portion of the tongue 7.

A crank operated reel 95 is suitably mounted on a forward upper end extension 97 of the post 89 with a pull cable 99 windable thereon for pulling the boat 37 upon the cradle 33 by means of a terminal hook 101 on the cable 99 engageable with a front bracket 103 on the boat 37.

The hold-down means comprises a pair of chains 105 suitably secured, as at 107, at one end on the braces 13 outwardly of opposite side bars 35 of the cradle 33, and tension springs 109 on said chains with terminal hooks 111 thereon adapted to engage over the gunwales 113 of the boat 37 when loaded onto the cradle 33. When the hold-down means is not in use, and when the cradle 33 is in boat supporting position, the hooks 111 may be engaged with selected bracket plates 71, as shown in FIGURE 1 to hold the chains 105 and spring 109 up off the ground against dragging. When the cradle 33 is swung into inverted position, as shown in FIGURE 3, the chains 105 may be looped around keeper fingers 123 on the chassis frame, and presently described, whereby to retain the chains 105 and springs 109 off the ground.

The pneumatic cushion means 55 supports the cradle 33 in the load supporting position of the cradle and is disposed beneath the side bars 35 between the pivots of the side bars 35 and the transverse center of said bars and whereby said bars 35 act to bear down on the pneumatic cushion means 55 in a manner and for a purpose presently seen. The pneumatic cushion means comprises a support plate 115 suitably secured on the tongue 7 and braces 13, an annular air cushion, preferably in the form of a conventional automobile tire 117, seating flatly on one side on said support plate 115, and a circular compressor plate 121 resting flatly on the other or top side of the annular cushion and supporting side bars 35 of the cradle 33. Upstanding keeper fingers 123, 125 on the braces 13, tongue 7 and support plate 115 respectively are grouped around the tire 117, or cushion, to center the same relative to the cradle 33.

The operation of the described trailer will now be briefly described. The boat 37 is loaded onto the trailer 1 by pulling said boat upwardly over the loading roller 77, over the cradle 33, onto the rollers 67 and the roller 61 until the prow of the boat is interposed between the rollers 81, all by operation of the reel 95 and cable 99 in a manner which will be clear. The reel 95 is, of course, provided with the usual holding means, not shown, for preventing its reverse action so that the boat 37 will be held on the cradle 33 against creeping rearwardly.

With the tire 11, or cushion, suitably inflated, the weight of the cradle 33 on th compression plate 121 compresses the tire, or cushion 117 between the plates 115, 121 sufficiently to expel air from between said plates 115, 121 and from within the confines of the tire, or cushion 117, until air seals are formed between the tire, or cushion 117 and said plates 115, 121 and a vacuum is created between said plates and within the confines of said tire, or cushion, 117 sufficient to hold said plates and the tire or cushion together by suction. Thus, no separate means is required for holding the tire, or cushion 117 and plates 115, 121 together. The inner tube 119 of the tire 117 may be variably inflated to inflate the tire, or cushion 117 variably as the case may require to best cushion the cradle 33 and a boat 37 on the cradle.

Obviously, when the cradle 33 is swung into inverted position, the length of the trailer is materially shortened, the advantage of which will be obvious.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A boat trailer comprising, in combination, a chassis frame having a pair of ground wheels thereon and a front end provided with means thereon for coupling to a tow vehicle, an elongated boat cradle mounted on the frame and having one end pivotally connected thereto at an intermediate point and, when in an operative position, projecting rearwardly therebeyond, said cradle being swingable forwardly to an inoperative position over the front portion of the frame for shortening the overall length of the trailer, and resilient pneumatic cushion means for said cradle mounted on said frame beneath and supporting said cradle for cushioning the cradle in said operative position.

2. A boat trailer according to claim 1, including resilient rollers on said cradle for supporting a boat on the cradle, hold-down means on the frame for securing a boat on the rollers, and means on said frame forwardly of said cradle attachable to a boat and operative to pull a boat onto the cradle.

3. A boat trailer according to claim 1, and hold-down means on said frame attachable to the gunwales of a boat on said trailer.

4. A boat trailer according to claim 1, said pneumatic means comprising an annular inflatable air cushion, a plate on said frame supporting said air cushion flatwise, and a compression plate seated flatwise on top of said air cushion, said cradle seating on said compression plate and compressing said cushion in response to the weight of the cradle on said compression plate to force air outwardly from within the confines of said cushion and between said cushion and plates to create a vacuum within the confines of said cushion causing said plates and cushion to adhere together by suction.

5. A boat trailer according to claim 1, said cradle comprising a pair of parallel side bars and resilient transverse rollers on said cradle at the ends of said bars for supporting a boat on the cradle at the ends of said bars and hold-down means on the frame for securing a boat on the rollers.

6. A boat trailer according to claim 1, and resilient hold-down means for a boat attached to said frame and having hooks thereon engageable over the gunwales of a boat on said cradle.

7. A boat trailer according to claim 1, said cradle including a pair of side bars, said means pivotally mounting said cradle comprising an upstanding yoke on said frame on which said side bars are pivoted, adjacent one end of said bars.

8. A boat trailer according to claim 1, said cushion means being disposed on said frame between the pivot of said bars and the transverse center of said bars for cushioning of the cradle by said cushion means.

9. A boat trailer according to claim 1, said cradle comprising a pair of side bars, rollers comprising a transverse roller journaled between one end of said bars for supporting a boat at an intermediate portion thereof, a pair of downwardly converging rollers journaled on said cradle at the other end of said bars for supporting the stern end of a boat, and a transverse roller on said cradle at said other end of the bars in the rear of said pair for use in loading a boat onto said cradle and hold-down means for securing a boat on the rollers, said hold-down means including chains connected at one end to the frame, springs having one end connected to the other ends of the chains, and hooks on the free ends of the springs engageable with the gunwale of the boat.

10. A boat trailer according to claim 9 and a pair of rearwardly diverging rollers mounted on said frame in front of said cradle for straddling the prow of a boat loaded onto said cradle.

11. A boat trailer according to claim 1, said cushion means comprising a plate on said frame, an annular inflatable air cushion seated flatly on said plate, and a compression plate seated flatly on said air cushion and seating said cradle thereon, said plates and air cushion being air sealed together by a vacuum within the confines of said air cushion and between said plates.

12. A boat trailer according to claim 11, said air cushion comprising an inflatable inner tube.

13. A boat trailer comprising, in combination, a frame, a boat cradle having an end pivotally secured to the frame at an intermediate point for vertical swinging movement between operative and inoperative positions, and a cushion on the frame for yieldingly supporting the cradle in said operative position, said cushion including a horizontal base plate affixed to the frame, a flexible, collapsible annuler casing resting by gravity on said plate, a flexible, inflated tubular ring mounted in the casing, and a flat, horizontal compression plate resting by gravity on the casing for receiving and supporting the cradle and depressible thereby for compressing the cushion and ejecting air therefrom and creating a partial vacuum therein for retaining the plates and casing in assembled relation by suction.

References Cited in the file of this patent

UNITED STATES PATENTS

| | | |
|---|---|---|
| 1,337,501 | Arluskes | Apr. 20, 1920 |
| 1,914,098 | Bean | June 13, 1933 |
| 1,949,172 | Miller | Feb. 27, 1934 |
| 2,624,594 | Gouirand | Jan. 6, 1953 |
| 2,704,665 | Zoltok | Mar. 22, 1955 |
| 2,809,046 | Andersson | Oct. 8, 1957 |
| 2,834,492 | Roy et al. | May 13, 1958 |
| 2,904,303 | Gentiline | Sept. 15, 1959 |
| 3,012,795 | Doerfler | Dec. 12, 1961 |